US 6,683,868 B1

(12) United States Patent
Couturier

(10) Patent No.: US 6,683,868 B1
(45) Date of Patent: Jan. 27, 2004

(54) GATEWAY MAKING IT POSSIBLE TO DEVELOP NEW SERVICES INDEPENDENTLY FROM THE UNDERLYING NETWORK

(75) Inventor: Alban Couturier, Chatillon (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/418,313

(22) Filed: Oct. 14, 1999

(30) Foreign Application Priority Data

Dec. 10, 1998 (FR) ............................................. 98 15577

(51) Int. Cl.[7] ............................................... H04L 12/66
(52) U.S. Cl. ....................... 370/352; 370/401; 370/410
(58) Field of Search ................................. 370/410, 468, 370/466, 389, 400, 401, 352–356

(56) References Cited

U.S. PATENT DOCUMENTS

| | | | | |
|---|---|---|---|---|
| 5,754,546 A | * | 5/1998 | Voit et al. .................... 370/384 |
| 6,026,091 A | * | 2/2000 | Christie et al. .......... 370/395.3 |
| 6,094,479 A | * | 7/2000 | Lindeberg et al. ..... 379/220.01 |
| 6,128,664 A | * | 10/2000 | Yanagidate et al. ......... 709/228 |
| 6,317,428 B1 | * | 11/2001 | Mercouroff et al. ........ 370/360 |
| 6,463,053 B1 | * | 10/2002 | Chen .......................... 370/352 |
| 2002/0126678 A1 | * | 9/2002 | Kelley et al. ............... 370/401 |

FOREIGN PATENT DOCUMENTS

| | | |
|---|---|---|
| EP | 0 726 682 A2 | 8/1996 |
| EP | 0 750 432 A1 | 12/1996 |
| EP | 0 873 024 A1 | 10/1998 |
| GB | 2 318 701 A | 4/1998 |

* cited by examiner

Primary Examiner—Wellington Chin
Assistant Examiner—Chirag Shah
(74) Attorney, Agent, or Firm—Sughrue Mion, PLLC

(57) ABSTRACT

A gateway enabling communication to take place between services situated on a first network and network elements forming a second network, it being possible for the services to transmit requests to use the specialized resources after a service call has been made by one of the switching points, wherein, on receiving each of the requests, the gateway:

chooses a specialized resource from among the specialized resources by means of a representation of the second network; and implements the necessary interchange with the first network so as to set up a connection between the switching point that triggered the request and the specialized resource.

9 Claims, 2 Drawing Sheets

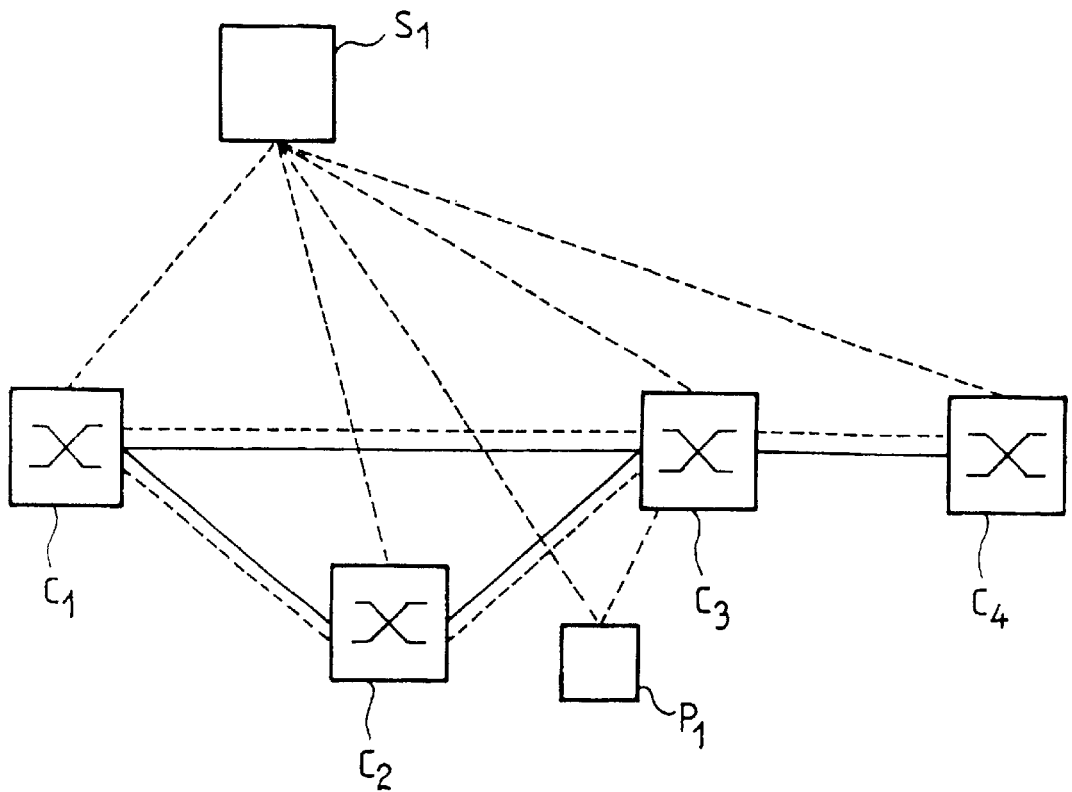
FIG_1
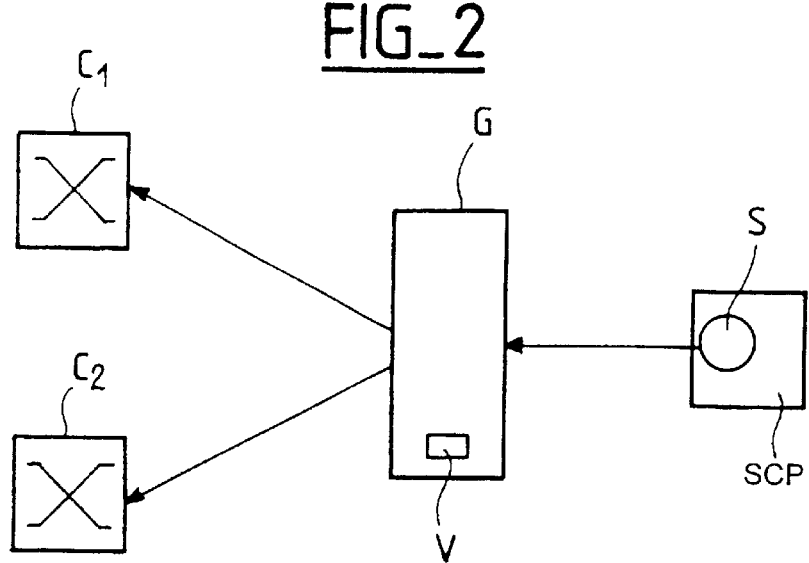
FIG_2

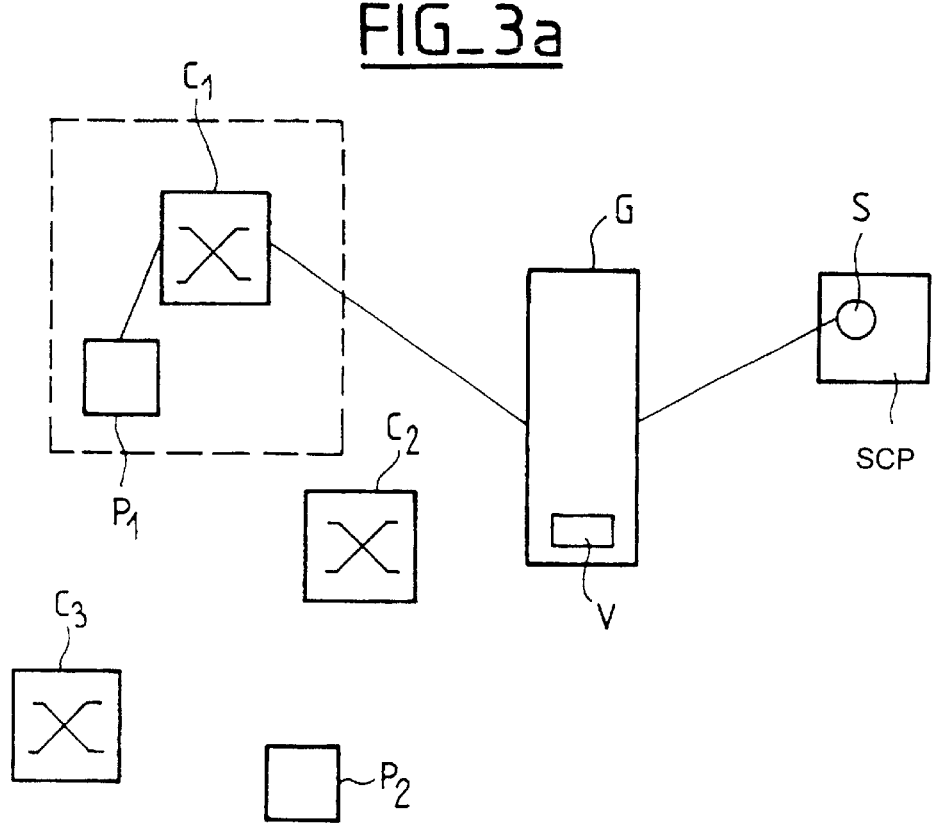
FIG_3a
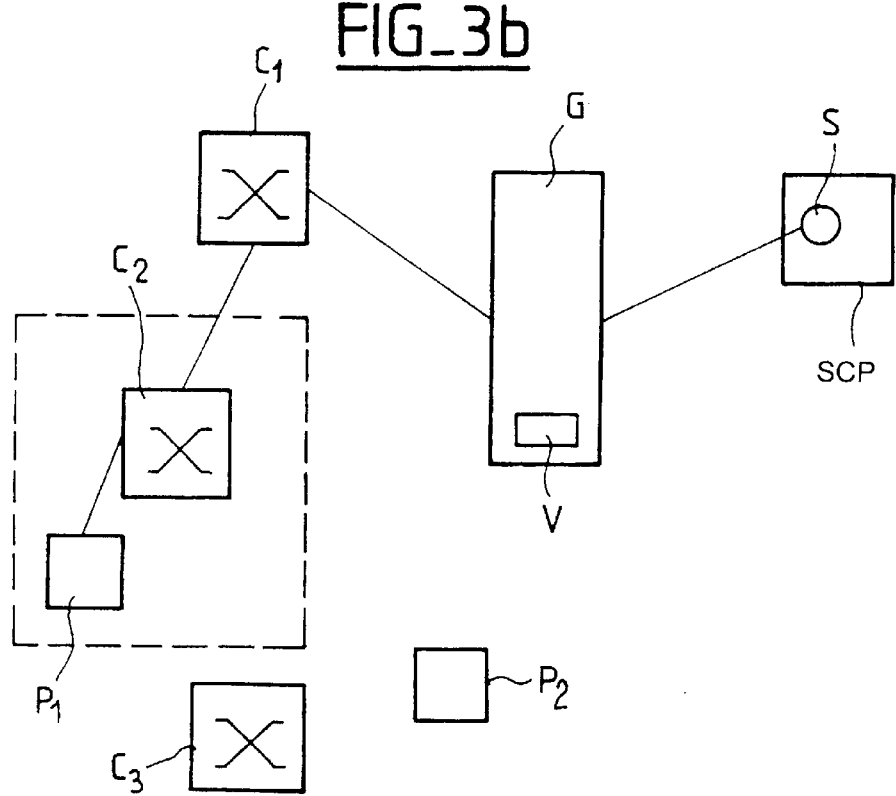
FIG_3b

GATEWAY MAKING IT POSSIBLE TO DEVELOP NEW SERVICES INDEPENDENTLY FROM THE UNDERLYING NETWORK

The present invention relates to a gateway between two networks making it possible for the services contained in the applications servers situated in a first network to transmit commands for modifying the behavior of the second network, and to receive information therefrom, without knowing the topology or the specific protocols thereof.

BACKGROUND OF THE INVENTION

The invention is particularly applicable to the case of an intelligent network (IN), e.g. as defined by the Q.1200 series of recommendations by the ITU-T (International Telecommunications Union—Telecommunications Standardization Section). The basic principle of the intelligent network is to separate the data-conveying (and in particular voice-conveying) functions from the supplementary services. This general principle has resulted in a hardware architecture such as the architecture shown in FIG. 1.

In FIG. 1, references $C_1$, $C_2$, $C_3$, and $C_4$ represent switches, i.e. nodes of the transport network which is drawn in solid lines in FIG. 1. Using the terminology specific to intelligent networks, the switches are also referred to as Service Switching Points (SSPs).

The switching points or "SSPs" are connected to one or more Service Control Points (SCPs).

In FIG. 1, reference $S_1$ illustrates one such SCP. The various services of the intelligent network are stored in the SCPs. By way of non-limiting example, the following services can be proposed:

special charging services (collect charging, shared charges, etc.);

customized call-filtering services; and call forwarding services.

Reference $P_1$ represents an intelligent peripheral (IP). An intelligent peripheral is typically a voice machine on which some spoken announcements are pre-recorded for the purpose of being delivered to a user of the network when a service is requested. Optionally, the intelligent peripheral makes it possible to interact with the user by enabling the user to enter a combination of keys on a telephone set or handset, which combination is then transmitted to the service.

The dashed lines show the signalling network, i.e. the network making it possible for all of the components of the intelligent network ($C_1$, $C_2$, $C_3$, $C_4$, $P_1$, $S_1$) to communicate with one another, independently from the transport network. In particular, the signalling network is used for conveying the messages for setting up a temporary connection between the SSP of a user and an intelligent peripheral, on the request of a service contained in an SCP.

In an intelligent network complying with the recommendations of the Q.1200 series from the ITU-T, the signalling protocol that is implemented between the service control point (SCP) and the network elements (i.e. switching points and intelligent peripherals) is the Intelligent Network Application Protocol (INAP) that is usually implemented on top of a stack of SS7-type protocols as defined by the Q.700 Recommendation by ITU-T.

It is also possible to use other protocols without adversely affecting the architecture or the principles of the intelligent network. Other protocols that can be used are constituted by proprietary protocols specific to suppliers of equipment for telecommunications networks.

In order to operate properly, certain services require the use of intelligent peripherals. For example, that applies to a service requiring the calling user to be authenticated. When a user uses such a service, the service connects the user initially to an intelligent peripheral serving the following purposes:

welcoming and guiding the user by means of suitable spoken announcements;

collecting the data necessary for authentication (personal identity number, etc.); and transmitting them to the service.

The intelligent peripheral in question may be integrated in the SSP of the user, or it may be connected directly thereto, or else it may be associated with another switching point and thus be accessible via the network only.

It can thus be observed that, in order to connect the user to the intelligent peripheral, the service must know firstly the location of the intelligent peripheral that is most suitable, using some particular criterion (e.g. the SSP that is closest to the user), and secondly the communications protocol that makes it possible to set up a connection with the intelligent peripheral.

That gives rise to two major drawbacks:

Firstly, it means that when a new service is being developed, account must be taken both of the architecture of the associated transport network, and also of the signalling protocol(s) implemented.

Secondly, it means that the operator of the transport network must make public its internal architecture as well as the protocols that it implements in order to offer services external to the operator. That constraint can be draconian for the operator.

OBJECTS AND SUMMARY OF THE INVENTION

An object of the present invention is to make the services independent from the architecture of the transport network and from the protocols that are implemented therein. To this end, the invention provides a gateway between two networks and enabling communication to take place between services contained on applications servers situated on the first network and network elements forming the second network, it being possible for said network elements to be switching nodes or specialized resources, it being possible for said services to transmit requests to use the specialized resources to said gateway after a service call has been made by one of said switching nodes, the gateway having:

selection means for acting on receiving each of the requests by choosing a specialized resource from among the specialized resources by means of a representation (V) of the second network; and connection means for implementing the necessary interchange with the network elements so as to set up a connection between the switching node from which the service call is made and the specialized resource.

In particular embodiments of the gateway of the invention, said gateway may include one or more of the following characteristics:

the representation contains a correspondence table between the network elements and the communications protocols they support;

the representation contains a correspondence table between the switching nodes and the specialized resources; and the specialized resources are intelligent peripherals, the switching nodes are service switching points, and the applications servers are service control points, in compliance with the recommendations of the Q.1200 series by ITU-T.

The invention also provides a method of connecting a switching node to a specialized resource from among a set of available specialized resources, on request from a service that has been called by said switching node, said service being contained by an applications server. The method including the following steps in order:

the service transmits a request to use a specialized resource to a gateway;

the gateway chooses a specialized resource from said set; and the gateway sets up the connection between the switching node and the specialized resource.

The invention also provides an intelligent network including at least one gateway of the invention.

A first advantage of the invention is that new services can be developed and deployed on the SCPs independently from the topology of the transport network, and more particularly from the relative disposition of the intelligent peripherals and of the SSPs, as well as from the communications protocol(s) used on the signalling network.

Another advantage, resulting from the first advantage, is that it is easily possible to manage a plurality of different protocols, e.g. different versions of INAP, for the same service.

BRIEF DESCRIPTION OF THE DRAWINGS

Other advantages and characteristics of the invention appear more clearly from the following description of various embodiments given with reference to the accompanying figures, in which:

FIG. 1 (discussed above) shows the overall architecture of an intelligent network;

FIG. 2 shows an architecture of the present invention; and

FIG. 3 shows how the invention may be applied to an intelligent network.

MORE DETAILED DESCRIPTION

In any telecommunications network the various network elements making up the network can communicate with different signalling protocols.

In the particular case of an intelligent network, the signalling protocol is INAP, as indicated above. However, different versions of this protocol exist.

For example, there is an INAP command referred to as "ConnectToResource" whose purpose is to set up a temporary connection between a service switching point (SSP) and an intelligent peripheral integrated in said switching point. This command includes a plurality of parameters, one of which serves to identify the intelligent peripheral to which the switching point must be connected.

In the ETS 300 374-1 specification from ETSI (European Telecommunications Standards Institute), this parameter is a routing identifier designating the intelligent peripheral.

In the Q.1218 Recommendation from ITU-T, the parameter may also be an identifier of a connection "leg", i.e., briefly, an address of an electronic circuit in the switching point.

Thus, the type and the value of this parameter depend on the recommendation implemented by the switching point.

In FIG. 2, the service S situated at the service control point SCP sends a connection request to the gateway G.

The gateway then consults the representation V that it has of the network. This representation may be defined as being a set of information about the topology of the network and/or about the protocols used by the various elements of the network.

As a function of the representation V and of the destination switching point to which the request is addressed, the gateway converts said request into at least one command that complies with the protocol supported by the destination switching point, and then, where applicable, implements dialogue with the elements of the network.

In a particular embodiment, this representation V may contain a correspondence table which matches the various network elements that can receive commands to the protocols that they support. An example of such a correspondence table may be as follows:

| Network element | Supported protocol(s) |
| --- | --- |
| $C_1$ | INAP1 |
| $C_2$ | INAP2 |

As a function of this table, the gateway G transmits a command that complies with the protocol INAP1 to the switching point $C_1$, if the switching point $C_1$ is the destination of the connection request, and it transmits a command that complies with the protocol INAP2 to the switching point $C_2$ if the switching point $C_2$ is the destination of the connection request.

FIGS. 3a and 3b show an embodiment for an intelligent network architecture including both switching points and also intelligent peripherals.

The service switching point $C_1$ requests execution of the service S situated at the service control point SCP. At some stage, this service S requires the use of an intelligent peripheral. It then sends a connection command to the gateway G. Since the service does not have the same knowledge as the network, it does not specify which of the intelligent peripherals it wishes to use.

By means of the representation V, the gateway G then determines which intelligent peripheral should be temporarily connected to the switching point $C_1$ in order for the service S to run properly.

This may be determined simply by means of a correspondence table contained in the representation V and that matches the various switching points ($C_1$, $C_2$, $C_3$) to the intelligent peripherals ($P_1$, $P_2$). Thus, for each switching point, it is possible to determine an intelligent peripheral with which the switching point is systematically associated when a connection request is issued by a service. Optionally, it is possible to add additional intelligent peripherals opposite each switching point in order to offer alternative solutions if the first intelligent peripheral fails or is overloaded.

An example of such a correspondence table is given below:

| Switching Point | Associated intelligent peripheral(s) |
| --- | --- |
| $C_1$ | $P_1$ |
| $C_2$ | $P_1$ |
| $C_3$ | $P_2$ |

This correspondence table may be established by the supplier or by the operator of the telecommunications network.

It may be based on various criteria. A good criterion may be that of proximity: each service switching point is associated with the nearest intelligent peripheral.

By means of the gateway of the invention, the mechanism that must be implemented to set up the connection between the intelligent peripheral and the destination switching point to which the connection request issued by the service S is addressed is transparent to the service representation point because it is handled entirely by the gateway G itself.

FIG. 3a shows the case when the associated intelligent peripheral $P_1$ is integrated in the destination switching point $C_1$.

In this case which is the simplest case, the connection request issued by the service S is merely converted into an INAP command referred to as "ConnectToResource" and that is sent to the switching point $C_1$. The intelligent peripheral $P_1$ sends any return values to the gateway G via another INAP command which may be converted into another protocol in order to be transmitted to the service.

Another possible case, shown in FIG. 3b, is that when the associated intelligent peripheral $P_1$ is connected directly to another SSP (or contained therein) referenced $C_2$ in the figure.

In which case, the connection request by the service S is converted by the gateway G into an INAP command referred to as "EstablishTemporaryConnection" which is transmitted to the destination SSP, referenced $C_1$, this command contains a plurality of parameters including:

- an identifier of the switching point ($C_2$) connected to the intelligent peripheral;
- a correlation identifier; and
- an identifier of the service control point.

Since it knows an identifier of the switching point $C_2$, the switching point $C_1$ can then dialogue with it. On receiving the first message from the switching point $C_1$, the switching point $C_2$ transmits an INAP command referred to as "AssistRequestInstruction" to the gateway G determined by the identifier of the service control point. By means of the correlation identifier, the gateway is capable of relating this command to the connection request issued by the service.

The gateway G can then transmit a "ConnectToResource" command to the switching point $C_2$, as in the preceding case, thus reducing to that case.

Other cases exist, and an exhaustive list of them is given in the ITU-T Recommendation Q.1218. In all cases, the specificities due to the relative locations of the intelligent peripheral and of the switch giving access to data about the caller are taken into account by the gateway G. From the point of view of the service, it is possible for only one command to be made available, which command corresponds to the request for use of a specialized resource. The programmer of the service needs neither:

- to determine the intelligent peripheral to which the switching point of the called party must connect itself; nor
- to manage the dialogue between the various network elements (switching points and intelligent peripherals) as a function of the different relative positions that can exist between them; nor
- to manage the various protocols that can be implemented by the network elements.

A gateway of the invention thus makes it possible for a developer of new services to develop such services without knowing the protocols and the architecture of the underlying network.

A particular embodiment consists in implementing the gateway and the service control point(s) on a Common Object Request Broker Architecture (CORBA) platform as specified by the Open Management Group (OMG). The communications protocol used between the gateways and the SCPs is then the CORBA communications protocol referred to as the "General Inter-ORB Protocol" or "GIOP".

What is claimed is:

1. A gateway between two networks and enabling communication to take place between services contained on applications servers situated on the first network and network elements forming the second network, said network elements comprising at least one of switching nodes and specialized resources, said services operative to transmit requests to use the specialized resources to said gateway after a service call has been made by one of said switching nodes, said gateway comprising:

selection means for acting on receiving each of said requests by choosing a specialized resource from among said specialized resources by means of a representation of said second network; and connection means for implementing the necessary interchange with said network elements so as to set up a connection between the switching node from which said service call is made and said specialized resource.

2. A gateway according to claim 1, wherein said representation contains a correspondence table between said network elements and the communications protocols they support.

3. A gateway according to claim 1, wherein said representation contains a correspondence table between said switching nodes and said specialized resources.

4. A gateway according to claim 1, wherein said specialized resources are intelligent peripherals, wherein said switching nodes are service switching points, and wherein said applications servers are service control points, in compliance with the recommendations of the Q.1200 series by ITU-T.

5. An intelligent network including a gateway according to claim 4.

6. A method of connecting a switching node to a specialized resource from among a set of available specialized resources, on request from a service that has been called by said switching node, said service being contained by an applications server, said method including the following steps in order:

said service transmits a request to use a specialized resource to a gateway;

said gateway chooses a specialized resource from said set; and said gateway sets up the connection between said switching node and said specialized resource.

7. A method according to claim 6, wherein the choice is made by consulting a correspondence table between said switching nodes and the specialized resources of said set.

8. A method according to claim 6, wherein said connection is set up by consulting a correspondence table that matches said switching nodes and said specialized resources, to the communications protocols that are supported.

9. A method according to claim 6, wherein said specialized resources are intelligent peripherals, wherein said switching nodes are service switching points, and wherein said applications servers are service control points, in compliance with the recommendations of the Q.1200 series by ITU-T.

* * * * *